United States Patent [19]

Jacobsen

[11] Patent Number: 5,141,155

[45] Date of Patent: Aug. 25, 1992

[54] INJECTION NOZZLE FOR THE INJECTION OF THERMOPLASTICS, CURABLE PLASTICS OR RUBBER

[75] Inventor: Per E. Jacobsen, Copenhagen, Denmark

[73] Assignee: Dan-Tip A/S, Copenhagen, Denmark

[21] Appl. No.: 681,546

[22] PCT Filed: Nov. 6, 1989

[86] PCT No.: PCT/DK89/00261

§ 371 Date: May 3, 1991

§ 102(e) Date: May 3, 1991

[87] PCT Pub. No.: WO90/05056

PCT Pub. Date: May 17, 1990

[30] Foreign Application Priority Data

Nov. 7, 1988 [DK] Denmark .............. 6201/88

[51] Int. Cl.$^5$ ................................. B05B 1/24
[52] U.S. Cl. .................... 239/135; 239/390; 239/591; 239/600
[58] Field of Search .............. 239/600, 591, 135, 456, 239/457, 390

[56] References Cited

U.S. PATENT DOCUMENTS

| | | | |
|---|---|---|---|
| 4,651,928 | 3/1987 | Schmidt | 239/135 |
| 4,678,125 | 7/1987 | Elston | 239/600 |

*Primary Examiner*—Andres Kashnikow
*Assistant Examiner*—Lesley D. Morris
*Attorney, Agent, or Firm*—Dressler, Goldsmith, Shore, Sutker & Milnamow, Ltd.

[57] ABSTRACT

The nozzle comprises a wear pipe (k) arranged in a supporting pipe (c) and comprising a nozzle tip (1) which by an external thread is screwed into an insert (e) at the outlet end of the nozzle housing (b). At the inlet end thereof, the wear pipe (k) carries a counter nut (m). The position of the nozzle tip (1) in the injection hole of a mould is adjusted by the nozzle tip being rotated in the thread of the insert (e), and after a fine adjustment the counter nut (m) is tightened against the back of the nozzle housing (a).

8 Claims, 2 Drawing Sheets

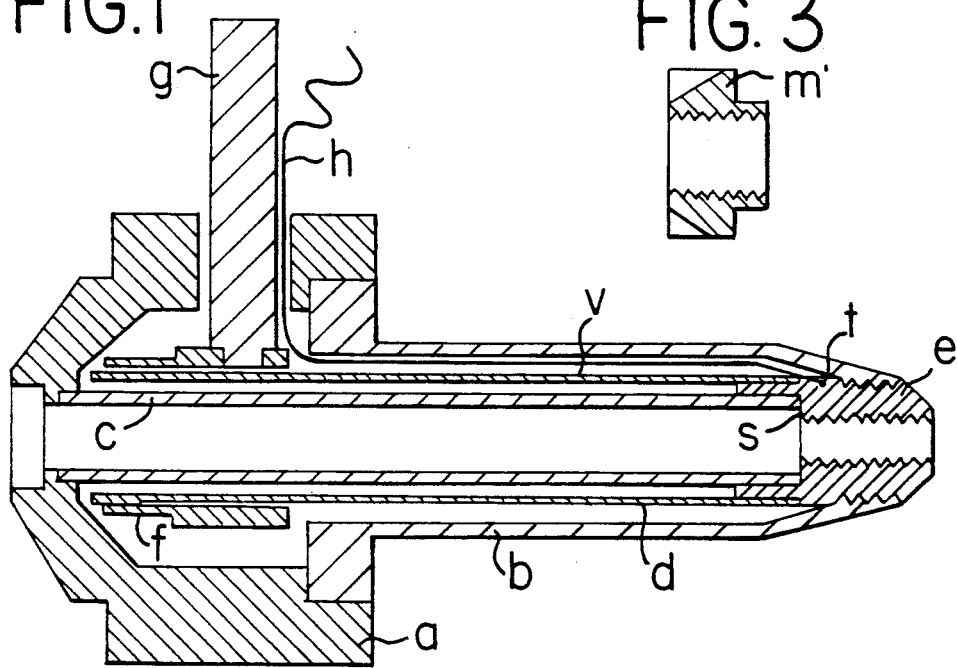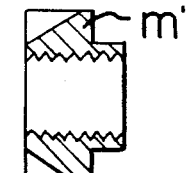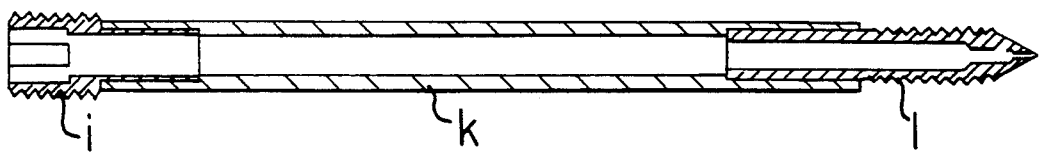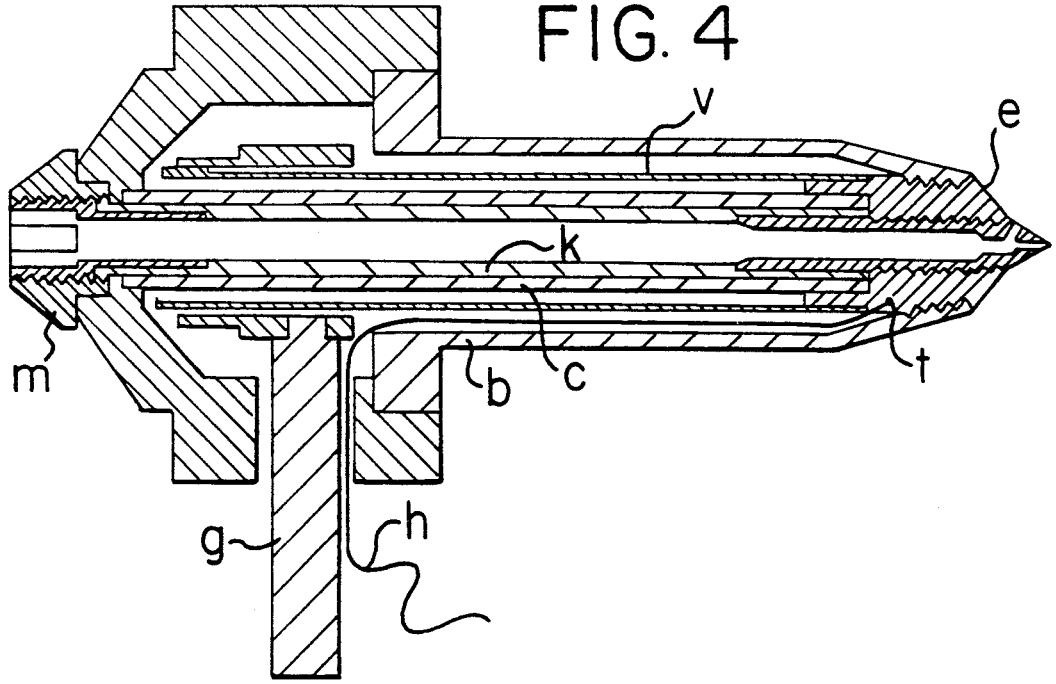

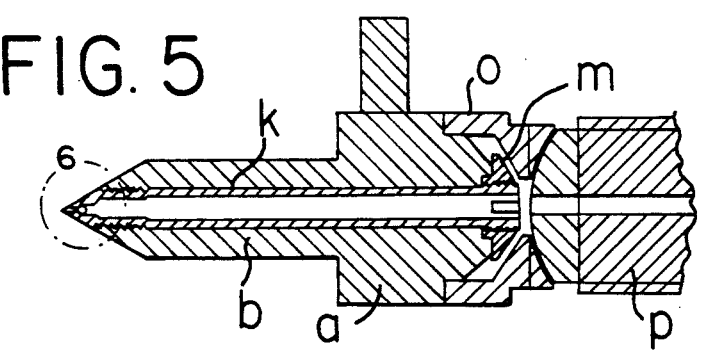
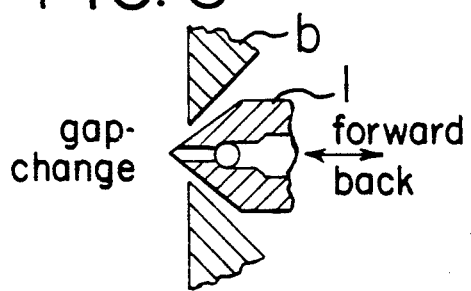
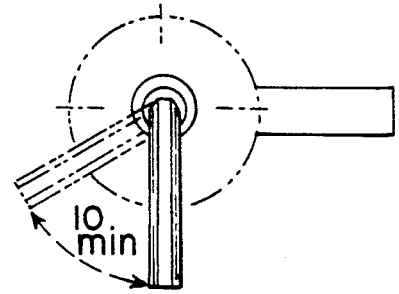
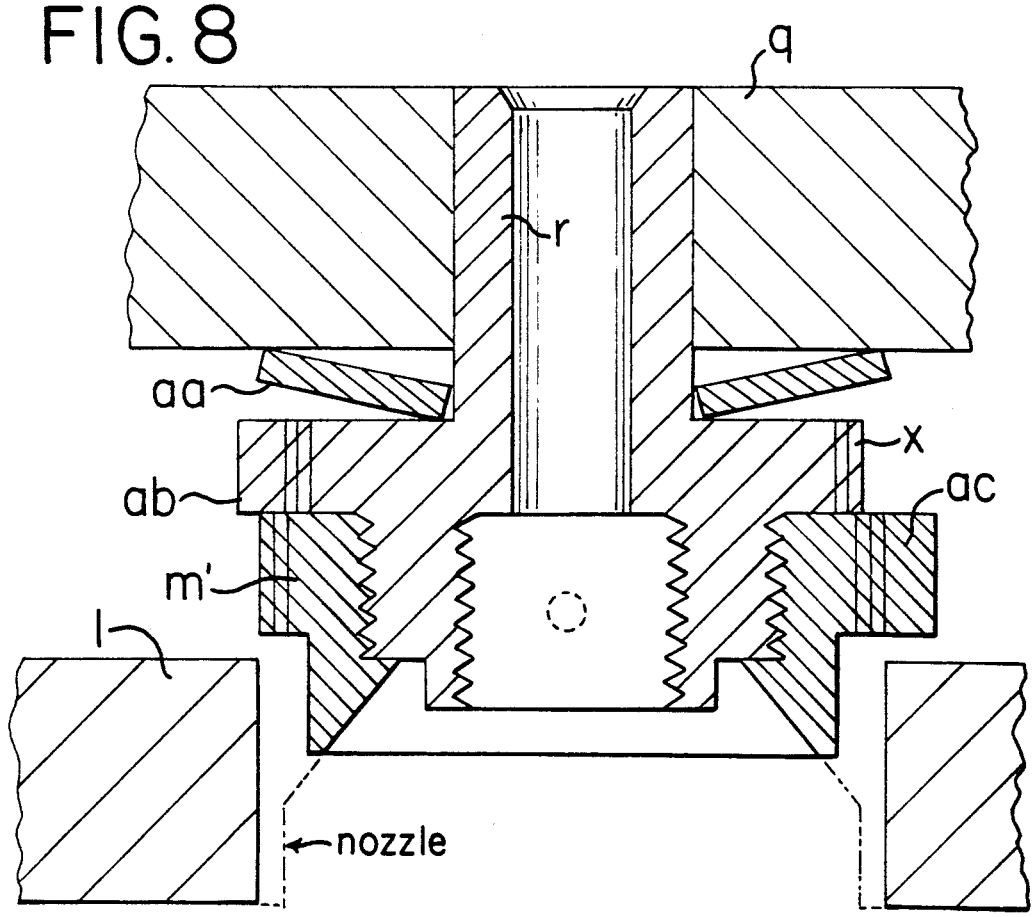

INJECTION NOZZLE FOR THE INJECTION OF THERMOPLASTICS, CURABLE PLASTICS OR RUBBER

The invention relates to a nozzle for injection of thermoplastic, thermosetting plastic or rubber, said nozzle comprising a nozzle housing with heating members and an interchangeable wear pipe which is surrounded by a supporting pipe retained in said housing, and at the outlet end of the nozzle ends in a nozzle tip.

The nozzle is especially intended to be used as an injection-moulding nozzle between a tool (mould) and an injection unit (worm) even though it may also be used in other connections, e.g. as an extrusion nozzle.

The nozzle with interchangeable wear pipe and nozzle tip is known, e.g. from the specification of DE-OS No. 34 31 173 and the specification of DK Patent Application No. 5069/86. In the nozzle referred to in the first-mentioned Published Patent Specification, every time it is desired to change the nozzle tip, it is necessary to take down and separate the tool which will often require several hours' work. However, in the nozzle according to the Danish Patent Application, wear pipes with different nozzle tips are easy to change as they can be withdrawn from the supporting pipe without it being necessary to separate the tool. Moreover, the position of the nozzle tip relative to the inlet of the tool may be adjusted by mounting a washer of a suitable thickness between the rearmost, conical part of the wear pipe and an end piece of the supporting pipe.

It is the object of the invention to provide a nozzle of the kind in question comprising an easily interchangeable wear pipe and nozzle tip, where the position of the nozzle tip in the inlet of the tool (injection hole) may be adjusted in a faster and easier manner without it being necessary to take down the tool from the machine, and the adjusted position is surely maintained.

According to the invention this is obtained by the nozzle tip being provided with an external thread engaging an internal thread at the outlet end of the nozzle housing, and the wear pipe at the inlet end thereof or the transition piece at one end thereof having an external thread engaging the internal thread of a counter nut capable of abutting on an end surface of the nozzle housing, and means for intervening with a tool to rotate the wear pipe for adjusting the position thereof in the nozzle housing.

The wear pipe with nozzle tip screwed into the nozzle housing may be moved up and down in the housing by being rotated with a tool, preferably an Allen key, said tool being inserted in the inlet end of the wear pipe, which is formed with a corresponding cross section, it thereby being possible to bring the nozzle tip into position opposite the outlet end of the nozzle housing or the injection hole of a tool wherein the nozzle is placed. After mounting of the tool, one or more "test shots" are made and the moulded article is evaluated, whereupon the position of the tip is changed by drawing the injection unit (worm) so far back that it is possible by hand to insert the Allen key in the nozzle from behind and change the position of the nozzle tip by rotating the wear pipe. During the injection moulding the counter nut acts as a shock absorber which safeguards the thread of the nozzle tip. In injection moulding in multiple tools, the counter nut may be formed as a gearwheel having an internal thread engaging an external thread of a transition piece which is clamped at the extended portion of the wear pipe, e.g. by pointed screws. Thereafter, toothed bars engaging the gear wheels may be used for fine adjustment of the position of the nozzle tip in the injection hole of the tool and, moreover, as nozzle adjustment indicators and, if desired, they may be connected to a driving mechanism which is controlled e.g. by temperature or pressure sensors mounted close to the nozzle tip so that it is possible to carry out a continuous, automatic adjustment.

Further embodiments and constructive features of the nozzle according to the invention are stated in the dependent claims and are explained in the following with reference to the drawing, in which FIG. 1 shows an embodiment of the nozzle according to the invention without any wear pipe and nozzle tip mounted, FIG. 2 a wear pipe with nozzle tip, FIG. 3 an embodiment of a counter nut for the nozzle according to the invention, FIG. 4 the complete nozzle, FIG. 5 the nozzle in assembled condition and connected with an injection unit, FIG. 6 an enlarged view illustrating the change of the gap when moving the wear pipe and tip, FIG. 7 a schematic view of the nozzle seen from the side of the worm and with inserted Allen key shown in two positions corresponding to two different adjustments of the wear pipe and tip, and FIG. 8 a sectioned view of a part of a heating channel with inserted transition piece and a counter nut for a nozzle according to the invention, not shown.

The nozzle shown in FIG. 1 is designed to be inserted between the injection unit of a spraying machine and the tool. The nozzle comprises a nozzle housing consisting of a rearmost housing portion a and a foremost housing portion b wherein a supporting pipe c is mounted which is surrounded by a heating member d. At the outlet end of the nozzle, the supporting pipe is carried into a tubular copper insert e and abuts on an annular shoulder. The insert e by an external thread is screwed into and soldered to the top of the housing portion b. Moreover, the insert e comprises an internal thread for receiving the thread of a nozzle tip 1 on a wear pipe k. A current cable is carried up to a current bridge for the heating member d, and a temperature-sensor cable h is connected to a temperature sensor t on the copper insert e.

At its inlet end, the wear pipe k shown in FIG. 2 is provided with a tubular insert i comprising an external thread and an internal portion of hexagonal cross-section for receiving an Allen key. The nozzle tip 1 inserted and fixedly fastened in the wear pipe k comprises an external thread for being screwed into the insert e of the nozzle housing and is shown here with a side hole as well as a tip hole, as both things may be expected to be used. For example, the following parts may be used: a) a tip which is solid at its end and comprises at least one side hole for discharge of plastic, b) a tip having a through-going central hole of a minimum hole diameter of 0.2 mm, or c) a combination of both.

In FIG. 4, the nozzle is shown with an inserted wear pipe k screwed into the insert e and carrying at its inlet end a counter nut m.

The shown construction makes an adjustment of the position of the nozzle tip in an injection hole, e.g. the inlet of the tool in an injection moulding machine, possible without it being necessary to remove the tool (mould) from the machine.

The fine adjustment is made in the following way:

In the first place, the wear pipe k is inserted in the nozzle housing and by means of an Allen key turned ahead in the thread of the insert e until the nozzle tip 1 appears in the injection hole. Thereafter, the counter nut m is screwed on the thread of the insert i of the wear pipe k without being tightened too much.

In the following, reference is made to FIG. 5 where the nozzle is placed between a tool not shown and a worm nozzle p with heating member partially shown. After placing of the counter nut m at the wear pipe k, a power absorber o and a centering ring (not shown) are mounted in usual manner at the rearmost housing portion a of the nozzle. The tool is mounted, and a "shot" (test moulding) is made, and the moulded article is evaluated. Thereafter, if it is desired to change the position of the tip, e.g. to carry it further ahead, one will just have to withdraw the injection unit so much that an Allen key is allowed to be inserted in the wear pipe k from the back of the nozzle whereafter an adjustment may be made by turning the key.

When the fine adjustmenst is finished after one or more "test shots", the nozzle tip must be fastened in the adjusted position. This is done by closing the tool and loosening the mould half located at the firm side. When the tool is again actuated to open, both mould halves will follow, i.e. the nozzle is withdrawn from the injection unit p, and there will be room for taking out the centering ring and the power absorber o. Thereafter, it is possible to tighten the counter nut against the back of the housing portion a of the nozzle, the wear pipe k with nozzle tip 1 being retained by the Allen key. Then, the mould is assembled, and the production may be started. During the moulding, the counter nut m acts as a shock absorber safeguarding the thread of the nozzle tip 1.

FIG. 6 shows how the gap in the nozzle mouth changes its width when the nozzle tip 1 is moved backwards or forwards, including change of position of nozzle tip with a central hole.

Moreover, FIG. 7 illustrates how the position of the Allen key indicates the position of the nozzle. For example, a turn over an angle corresponding to 10 minutes on a dial may correspond to a displacement of the nozzle tip in the longitudinal direction of about 0.11 mm. Thereby it is possible all the time to have a general knowledge of what adjustments have been made.

FIG. 8 shows a manner how to mount the nozzle in an outlet of a heating channel q. By an internal thread, the counter nut m', which comprises an internal conical contact face, is here screwed on to an external thread of a cylindrical transition piece r having a cylindrical neck portion, which is mounted with slide fit in the outlet, and comprising between its external thread and the neck portion a flange portion formed as a gear-wheel x. Furthermore, in its outlet end, the transition piece r comprises an internal thread wherein the thread i of the wear pipe k may be received and retained by tightening of a pointed screw y, the housing portion b on the nozzle (not shown in FIG. 8) being carried through an opening of the housing z of the heating channel. So, in this case the external thread of the wear pipe k, which engages the counter nut m', is the external thread of the transition piece r which is firmly secured on the wear pipe k. One or more spring washers aa ensuring the tightness during the injection moulding are placed between the heating channel q and the gear-wheel x.

The fine adjustment is carried out like described above, the wear pipe k in this case, however, being turned backwards or forwards in the insert e of the nozzle housing and internally in the supporting pipe c by rotating the gear-wheel x of the transition piece by a first toothed bar ab while the counter nut m' is retained unrotatably by a second toothed bar ac. When the optimum position of the nozzle tip 1 in the injection hole of the tool has been found, the wear pipe with toothed bar ab and gear-wheel x is retained, and the counter nut m' by the toothed bar ac is tightened firmly against the conical back of the housing portion a of the nozzle.

If during the injection moulding it appears that a further adjustment of the position of the nozzle tip 1 is necessary, the nozzle tip may be turned backwards or forwards in the insert e by rotating the gear-wheel x of the transition piece by means of the toothed bar ab, the cylindrical neck portion of the transition piece r thereby moving a little backwards or forwards in the outlet of the heating channel q. Thereby, the position of the toothed bar ab may also be used to indicate the position of the nozzle. This arrangement is suitable for being used in connection with multiple tools where the heating channel feeds material to several nozzles. Moreover, the toothed bars may also be used for continuous automatical adjustment of the nozzle position, the toothed bars being driven by motors which are controlled e.g. by signals from temperature or pressure sensors at the outlet end of the nozzles.

Instead of being screwed in a thread of the transition piece r, the wear pipe k by groove-slot connections may also be inserted in the opening of the transition piece and be retained in the longitudinal direction by means of a bayonet lock or in a similar manner.

I claim:

1. A nozzle for injection of thermoplastic, thermosetting plastic or rubber, said nozzle comprising a nozzle housing having inlet and outlet ends, a supporting pipe retained in said housing, heating means in said housing surrounding said supporting pipe and an interchangeable wear pipe assembly disposed within said supporting pipe including a nozzle tip provided with an external thread to engage an internal thread provided at the outlet end of the housing, said wear pipe assembly also defining an external threaded portion adjacent the inlet end of the housing to engage a threaded portion adjacent the inlet end of the nozzle housing and connecting means defining an internal thread for engaging the external thread portion of said wear pipe assembly and the inlet end of said nozzle housing to affix the position of said wear pipe assembly relative to said nozzle housing and means for adjusting the position of the wear pipe assembly relative to said housing.

2. A nozzle according to claim 1 in which the nozzle tip is separable from said war pipe assembly.

3. A nozzle according to claim 1 or 2 in which the internal threaded portion at the outlet end of the nozzle housing is formed by a copper insert that is externally threaded into and hard-soldered to the nozzle housing.

4. A nozzle according to claim 1 or 2 in which the wear pipe assembly at its end adjacent the inlet of the housing defines a recess in the shape of a hexagon for receiving means for adjusting the position of the nozzle tip relative to the nozzle housing.

5. A nozzle for injection of thermoplastic, thermosetting plastic or rubber, said nozzle comprising a nozzle housing having inlet and outlet ends, a supporting pipe retained in said housing, heating means in said housing surrounding said supporting pipe and an interchangeable wear pipe assembly disposed within said supporting pipe including a nozzle tip provided with an external thread to engage an internal thread provided at the outlet end of the housing, said wear pipe assembly also defining an external threaded portion adjacent the inlet end of the housing to engage a threaded portion adjacent the inlet end of the nozzle housing and means including a gear assembly for adjusting the position of the wear pipe assembly relative to said housing.

6. A nozzle according to claim 5 in which said last-mentioned means comprises a transition piece defining at one end an internal threaded portion that engages the externally threaded portion of the wear pipe assembly and at its other end defines a cylindrical neck portion capable of being longitudinally received in a heating means, said transition piece including a flange portion, the outer periphery of which is part of said gear assembly.

7. A nozzle according to claim 6 including spring means located around the neck portion of the transition piece, which springs at their inner periphery abut against the flange portion of the transition piece.

8. A nozzle for injection of thermoplastic, thermosetting plastic or rubber, said nozzle comprising a nozzle housing having inlet and outlet ends, an interchangeable wear pipe assembly disposed within said housing including a nozzle tip provided with an external thread to engage an internal thread provided at the outlet end of the housing, said wear pipe assembly also defining an external threaded portion adjacent the inlet end of the housing to engage a threaded portion adjacent the inlet end of the nozzle housing and connecting means defining an internal thread for engaging the external thread portion of said wear pipe assembly and the inlet end of said nozzle housing to affix the position of said wear pipe assembly relative to said nozzle housing and means for adjusting the position of the wear pipe assembly relative to said housing.

* * * * *